United States Patent [19]

Furomoto

[11] Patent Number: 5,207,396
[45] Date of Patent: May 4, 1993

[54] FISHING REEL
[75] Inventor: Yoshiyuki Furomoto, Osaka, Japan
[73] Assignee: Shimano, Inc., Osaka, Japan
[21] Appl. No.: 635,649
[22] Filed: Dec. 28, 1990
[51] Int. Cl.⁵ .......................................... A01K 89/015
[52] U.S. Cl. ..................................... 242/321; 384/102; 384/126
[58] Field of Search ............... 384/101, 102, 126, 127; 242/321, 322

[56] References Cited

U.S. PATENT DOCUMENTS

| | | | |
|---|---|---|---|
| 3,104,850 | 9/1963 | Wood | 242/321 X |
| 3,315,913 | 4/1967 | Grieten | 242/321 X |
| 3,532,296 | 10/1970 | Murvall | |
| 3,642,331 | 2/1972 | Silver | 384/102 |
| 3,670,985 | 6/1972 | Morishita | |
| 3,854,781 | 12/1974 | Bildtsen | 384/102 |
| 3,966,140 | 6/1976 | Coquelet et al. | 242/321 X |
| 4,116,502 | 9/1978 | Hörler et al. | 384/126 |
| 4,324,440 | 4/1982 | Steigenberger | 384/102 |
| 4,394,991 | 7/1983 | Noda | 242/321 |
| 4,542,994 | 9/1985 | Mohsin | 384/101 |
| 4,927,274 | 5/1990 | Smith | 384/101 |

Primary Examiner—Katherine Matecki
Attorney, Agent, or Firm—Dickstein, Shapiro & Morin

[57] ABSTRACT

A fishing reel is formed of a reel body, a spool, a support shaft for supporting the spool for rotating in unison therewith, a sleeve loosely fitted on the support shaft for free rotation, and a bearing. The bearing includes an inner race fitted on the sleeve. The support shaft is supported by the reel body through the bearing.

12 Claims, 2 Drawing Sheets

FISHING REEL

BACKGROUND OF THE INVENTION

1. Field of the Invention

The present invention relates to a fishing reel, and more particularly to the art for supporting a support shaft of a spool taking up a fishing line.

2. Description of the Prior Art

According to an example of the conventional two-bearing fishing reels of the above-noted type, the support shaft of the spool taking up the fishing line is rotated in unison with the spool. In such a reel, the support shaft is supported by a reel body through bearings.

In casting for fish with the two-bearing reel having the support shaft rotating in unison with the spool, the fishing line is unwound from the spool at an extremely high speed when a rod is swung for casting. The tendency that the fishing line is unwound at a high speed can be particularly marked when the rod is swung at a high speed in an attempt to do a casting to a great distance. It is not unusual that the spool is rotated at 20,000 rpm in such a casting.

However, in the conventional two-bearing reel in which the support shaft rotating in unison with the spool is supported by the reel body through the bearings, the bearings cannot be rotated at a high speed due to its inertia in most of the cases if a rotational speed of the support shaft reaches a large value in a very short time as in the aforementioned casting. As a result, problems occur that a forcible rotation is produced between the support shaft and the bearings thereby to cause abrasion of the support shaft, that a casting distance is reduced the bearings become a resistance against rotation of the spool, and that the durability of the bearings is deteriorated resulting from the frequent high speed rotation.

SUMMARY OF THE INVENTION

An object of the present invention is to provide a two-bearing fishing reel free from the abrasion of the support shaft, the decrease of the casting distance, and the deterioration of the durability of the bearing, even if the rotational speed of the support shaft in casting reaches a large value in a very short time.

In order to achieve the above object, the present invention is characterized by a fishing reel comprising a reel body, a spool, a support shaft for supporting the spool and rotating in unison therewith, a sleeve loosely fitted on the support shaft for free rotation, and a bearing, in which the bearing includes an inner race fitted on the sleeve, and the support shaft is supported by the reel body through the bearing.

Operations and effects are as follows.

In constructing the present reel as shown in FIG. 1, when the rotational speed of the support shaft 9 reaches a large value in a very short time in casting, the support shaft 9 is permitted to rotate relative to the sleeve 20. Since the sleeve 20 is rotatable relative to the bearing 21, an inertial force of the bearing 21 is not immediately exerted on a rotational force of the support shaft 9. More particularly, an inertial force of the sleeve 20 which can be lightened is gradually applied to the support shaft 9 first, and then the inertial force of the bearing 21 is gradually applied to the support shaft 9 through the sleeve 20. Furthermore, the support shaft 9 is supported through the sleeve 20, as a result of which the large bearing 21 is used compared with the conventional structure.

It is further advantageous if the bearing includes an outer race supported by the reel body for free rotation. With the above structure, as shown in FIG. 1, the outer race of the bearing 21 is supported by the reel body for free rotation, which permits the bearing to rotate in unison with the support shaft 9 when rotating at a high speed. Thus, the inertial force applied to the support shaft 9 can be further reduced.

Therefore, the relatively simple improvement that the support shaft is supported through the sleeve and the bearing can provide the two-bearing fishing reel in which the support shaft is hardly abraded, the casting distance is unlikely to be decreased, and the durabilility of the bearing is improved by the large bearing, even if the support shaft is frequently rotated at a high speed.

Other objects, features and advantages will be apparent from the following description with reference to the accompanying drawings.

BRIEF DESCRIPTION OF THE DRAWINGS

The drawings show a fishing reel embodying the present invention in which.

DESCRIPTION OF THE PREFERRED EMBODIMENTS

The present invention will be described in detail referring to the accompanying drawings.

Figure 1:
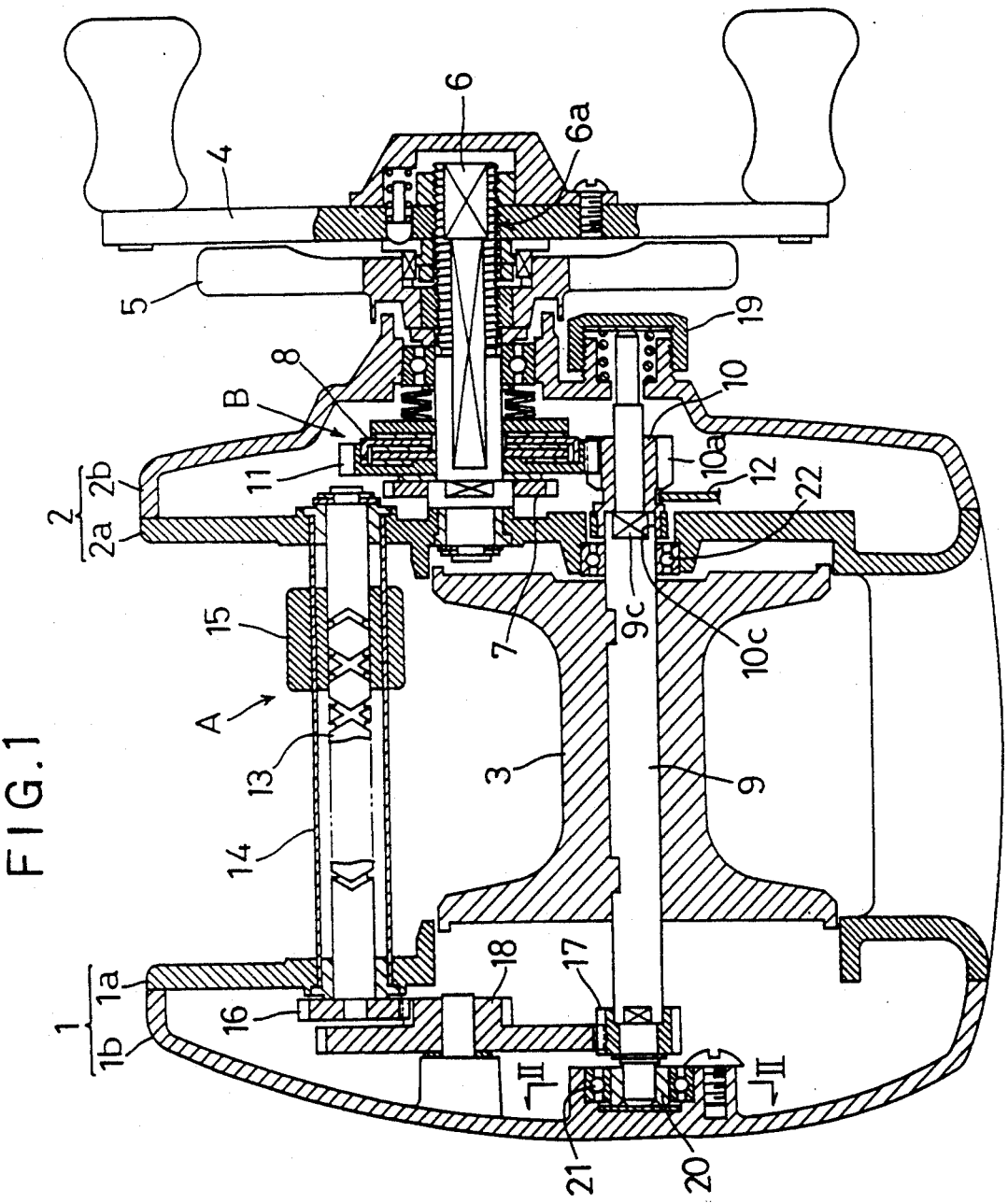
FIG. 1 is a plan view in section of the fishing reel.

FIG. 1 show a two-bearing fishing reel comprising, for use as attached to a rod (not shown), side members 1 and 2 mounted laterally of the reel, a level wind mechanism A disposed in a forward portion between the side members 1 and 2, a spool 3 disposed in a middle portion between the side members, and a handle 4 for taking up a fishing line and a drag adjusting element 5 for adjusting a friction force of a drag mechanism B mounted on the right side member 2, respectively.

As shown in FIG. 1, the left and right side members 1 and 2 include resin inner side plates 1a and 2a and resin outer wall members 1b and 2b for covering the side plates, respectively. A rotary shaft 6 carrying the handle 4 is supported extending through a space defined between the right side plate 2a and the right wall member 2b. The rotary shaft 6 includes at an inner end portion the drag mechanism B and a ratchet wheel 7.

The drag adjusting element 5 is screwed to a threaded portion 6a defined in the rotary shaft 6 to be rotated thereby to adjust a pressure force of a friction plate 8 forming the drag mechanism B. The ratchet wheel 7 comprises a toothed wheel plate for preventing the handle from rotating in a reverse direction (a direction for unwinding the fishing line from the spool) by cooperating with a pawl (not shown) for preventing reverse rotation.

The spool 3 is rotated in unison with a support shaft 9 having a sliding control member 10 loosely rotatably fitted on a right end portion thereof. The sliding control member 10 defines an input gear portion 10a meshed with an output gear 11 of the drag mechanism B, and an engaging recess 10c engageable with an engaging portion 9c of the support shaft 9 to form the sliding control member 10 integrally with the support shaft 9.

The sliding control member 10 is slided by a shifter 12 shifted by a control element (not shown) provided in an outer face of a reel body. When the engaging portion 9c and the engaging recess 10c are engaged with each other, a rotational force of the handle 4 is transmitted to the spool 3 to enable the fishing line to be wound up. Conversely, when the engaging portion 9c is disengaged from the engaging recess 10c, the spool 3 is freely rotated to enable the fishing line to be unwound from the spool 3.

The level wind mechanism A includes a screw shaft 13 defining an endless groove, a guide member 14 for covering before, behind and above the screw shaft 13, and a fishing line guide member 15 slidably reciprocating along the guide member 14 when the screw shaft 13 is rotated. An intermediate gear 18 is disposed between a gear 16 mounted on an end portion of the screw shaft 13 and a gear 17 mounted on an end portion of the support shaft 9. This allows the fishing line guide member 15 to reciprocate sideways following rotation of the spool 3 thereby to winding up the fishing line uniformly on the spool 3.

The support shaft 9 of the spool 3 is loosely supported at opposite end by the left outer wall member 1b and the right side plate 2a. A cap nut 19 acting as a rotational control member is provided in the right outer wall member 2b for adjusting the pressure force exerted on the opposite ends of the support shaft 9 thereby to effect speed control of free rotation of the spool 3.

Figure 2:
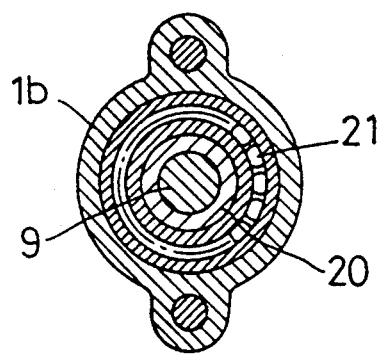
FIG. 2 is a section taken along a line II—II of FIG. 1.
Figure 4:
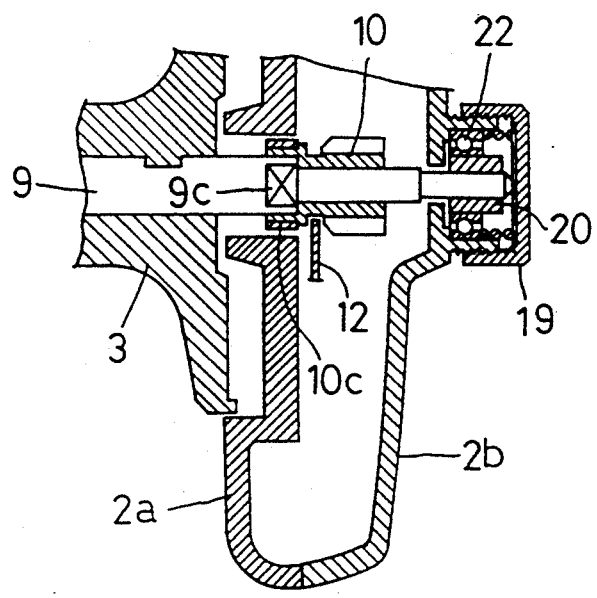
FIG. 4 is a fragmentary section showing a reel according to another embodiment.

As can be seen from FIGS. 1 and 2, a resin sleeve 20 is fitted on the end portion of the support shaft 9 supported by the left side member 1 to freely rotate relative to the support shaft 9. As illustrated in FIGS. 1 and 4, the end portion of the support shaft has a reduced diameter. An inner race of a ball bearing 21 supported by the left outer wall member 1b is loosely fitted on the sleeve 20.

With the above-noted reel, since the sleeve 20 loosely fitted on the support shaft 9 carries the bearing 21 fitted thereon, a control force is unlikely applied on the spool 3 in casting thereby to permit a casting to a further great distance compared with the conventional structure having the bearing directly fitted on the support shaft 9. In addition, the support shaft 9 is hard to be subjected to abrasion and the bearing 21 improves its durability by an enlarged diameter thereof.

The control force can be further restrained if an outer race of the bearing 21 is loosely supported by the outer wall member 1b.

Figure 3:
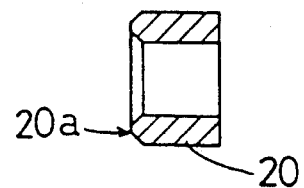
FIG. 3 is a section of a sleeve.

As shown in FIG. 3, an end face 20a of the sleeve 20 is tapered to reduce a contact area for less exerting a resistance on the support shaft 9.

Apart from the foregoing embodiment, the sleeve 20 may be formed of sintered metal for enhancing its strength thereby to prevent disalignment of the support shaft 9. Alternatively, the sleeve 20 may be formed of ceramic to improve anti-abrasiveness. The sleeve 20 may be mounted between a bearing 22 shown in FIG. 1 and the support shaft 9.

As shown in FIG. 4, the bearing 22 and the sleeve 20 may be disposed between the right outer wall member 2b and the support shaft 9, instead of between the right side plate 2a and the support shaft 9.

The fishing reel according to the present invention can be also applied to a single bearing fishing reel.

What is claimed is:

1. A fishing reel comprising:
    a reel body;
    a spool (3);
    a support shaft (9) for supporting said spool (3) and rotating in unison therewith;
    a sleeve (20) which is separate from said support shaft, said sleeve being loosely fitted on said support shaft (9) so as to be slidably rotatable with respect to said support shaft (9); and
    a bearing (21) having an inner race fitted on said sleeve (20);
    wherein said support shaft (9) is supported by said reel body through said bearing (21).

2. A fishing reel as claimed in claim 1 wherein the bearing (21) includes an outer race loosely supported by the reel body for free rotation.

3. A fishing reel as defined in claim 2, wherein the inner race of the bearing is loosely fitted on the sleeve for free rotation.

4. A fishing reel as claimed in claim 3 wherein said support shaft has opposite end portions, and wherein the sleeve (20) is loosely fitted on said support shaft (9) at one of said opposite end portions.

5. A fishing reel as claimed in claim 4 wherein said sleeve (20) includes a tapered end face (20a).

6. A fishing reel as claimed in claim 5 wherein said sleeve (20) is made of material having a good anti-abrasiveness.

7. A fishing reel as claimed in claim 4 wherein said one end portion of said support shaft has a reduced outer diameter.

8. A fishing reel as claimed in claim 1, wherein the inner race of the bearing is loosely fitted on the sleeve for free rotation.

9. A fishing reel as claimed in claim 8 wherein the support shaft has opposite end portions, and wherein the sleeve (20) is loosely fitted on the support shaft (9) at one of said opposite end portions.

10. A fishing reel as claimed in claim 9 wherein said one end portion of said support shaft has a reduced outer diameter.

11. A fishing reel as claimed in claim 9 wherein the sleeve (20) includes a tapered end face (20a).

12. A fishing reel as claimed in claim 11 wherein the sleeve (20) is made of material having good anti-abrasiveness.

* * * * *